(12) United States Patent
Trummer

(10) Patent No.: US 8,217,796 B2
(45) Date of Patent: Jul. 10, 2012

(54) CHILD SEAT SAFETY SYSTEM

(76) Inventor: Marcus Alexander Trummer, Las Vegas, NV (US)

( * ) Notice: Subject to any disclaimer, the term of this patent is extended or adjusted under 35 U.S.C. 154(b) by 328 days.

(21) Appl. No.: 12/561,509

(22) Filed: Sep. 17, 2009

(65) Prior Publication Data

US 2010/0090836 A1    Apr. 15, 2010

Related U.S. Application Data

(60) Provisional application No. 61/104,673, filed on Oct. 10, 2008.

(51) Int. Cl.
*G08B 23/00* (2006.01)
(52) U.S. Cl. .................. 340/573.1; 340/573.4; 340/438; 340/439; 340/457.1; 340/522; 340/665; 340/667; 340/668
(58) Field of Classification Search ............... 340/573.1, 340/573.4, 438, 439, 457.1, 522, 665, 667, 340/668
See application file for complete search history.

(56) References Cited

U.S. PATENT DOCUMENTS

| | | | | |
|---|---|---|---|---|
| 7,567,181 B1* | 7/2009 | Davison | ..................... | 340/573.1 |
| 7,714,737 B1* | 5/2010 | Morningstar | .................. | 340/667 |
| 2006/0208911 A1* | 9/2006 | Davis | ......................... | 340/573.4 |

* cited by examiner

*Primary Examiner* — Tai T Nguyen
(74) *Attorney, Agent, or Firm* — Howard & Howard Attorneys PLLC

(57) ABSTRACT

The Child Seat Safety System provides drivers (common vehicles) with an alarm and monitoring system for the attachment of safety harnesses and temperature readings for respective child seat occupants within the car. The monitoring component details the attached "status" of said harnesses through indicator lights on the main operator dashboard along with on the system device. Alarm features automatically warn either the driver or surrounding bystanders or emergency personnel of alarm situation including temperature variances, harness disengagement, accident or unattended occupant warnings. The Child Seat Safety System can reduce the risk of small children being injured due to unattached seat belts during accident, braking or collision, and can reduce exposure to unhealthy temperatures either during driving or from extended lengths of time being unattended in a car.

20 Claims, 4 Drawing Sheets

CHILD SEAT SAFETY SYSTEM

FIELD OF THE INVENTION

Motor Vehicle Passenger Safety Devices

BACKGROUND OF INVENTION

The safety for babies and small children (children) within vehicles has been the center of various debates for auto manufactures, consumer and government safety groups, along with respective parents or guardians. At the heart of these debates is the prime directive of providing the safest possible environment for children while be transported or inside motor vehicles.

The US Department of Transportations issued new regulations for such on Sep. 18, 2006, which require children under three years of age to use a child restraint and that drivers are legally responsible for making sure that children under 14 years use seat belts. Supplementing federal standards, all states have codified variations for safety belt enforcement (primary/secondary), fines for such, child restraint requirements, fines for such, ages for such, exempted vehicles and other.

It should be noted that to meet these requirements, many child seat products have been developed and that child seat technology has drastically improved over the last few decades. One significant innovation and government requiring the use of the Lower Anchors and Tethers for Children (LATCH) system. Assisting in a different way, another important program, WHALE, "We have a little emergency—Child Safety Seat Occupant Identification Program'" assists drivers with child care after an accident has occurred.

However, with such and a host of other advances, the National Highway Traffic Safety Administration (NHTSA) has recently launched (Mar. 2, 2009) a Statement of Review of Federal Standards for Child Safety Seats and has stated, "though current standards are exceedingly thorough, the agency is always looking at ways to make highway travel even safer for children."

The number one reason according to NHTSA is that "every year, thousands of young children are killed or injured in crashes, mainly because 3 out of every 4 children in child safety seats are not properly secured, or even worse, not restrained at all."

Aside from direct child seat safety technology and related advances, hindering the attention to children in vehicles is the other societal advances in technology within and not part of the vehicle with regards to navigation (GPS), communication (hands free, cell phones, PDA's), entertainment (TV's, I-pods, Games, radio, internet), and other factors such as marketing along our nations highways and roads and general population increases which impede the focus of respective drivers. Accordingly, the monitoring of Children within a vehicle has gone from a prime parental concern to a part of larger social order harboring so many distractions which has lead to either serious injury and deaths of children through driver mistake and negligence. Quoting the American Academy of Pediatrics. "Never leave your child alone in or around cars. Any of the following can happen when a child is left alone in or around a vehicle: Temperatures can reach deadly levels' in minutes, and the child can die of heat stroke. They can be strangled by power windows, sunroofs, or accessories. They can knock the vehicle into gear, setting it into motion or be backed over when the vehicle backs up."

Pursuant to such, there is a clear need for the Child Seat Safety System, which continues the societal development of ways to improve the safety of our children. Currently, there is no real time monitoring system for the connectivity and environment monitoring surrounding children in child seats. Continuing there is no automated notification to the driver or the vehicle owner of issues with connectively or rises in temperature. Lastly, in the case when the driver is not available (left child in car) or is incapacitated from a an accident, existing technologies do not initiate an alarm sequence to notify either near-by third parties, identification of a child in car for emergency personnel, or notification to the driver and others indicating a dangerous situation. We believe the CSSS addresses such issues and should be considered for use on all vehicles equipped to install child seats.

BRIEF SUMMARY OF THE INVENTION

The Child Seat Safety System provides drivers and other vehicle occupants with an alarm and monitoring system for the attachment of safety harnesses for respective child seat occupants within the car and for detailing changes in temperatures in the child seat immediate environment. The monitoring components are programmable for various alarm features and the device than provides on-going details relating to the attached "status" of said harnesses and temperatures through indicator lights on the main operator dashboard along with on the system device. Other alarm features automatically warn the driver, surrounding bystanders, or emergency personnel of alarm situations which include significant temperature variances, harness disengagement, accident or unattended occupant warnings.

BRIEF SUMMARY OF THE SEVERAL VIEWS OF THE DRAWING

The attached figures consist of the following, and make reference to, the detailed description outlined below.

DETAILED DESCRIPTION OF THE INVENTION

Figure 1:
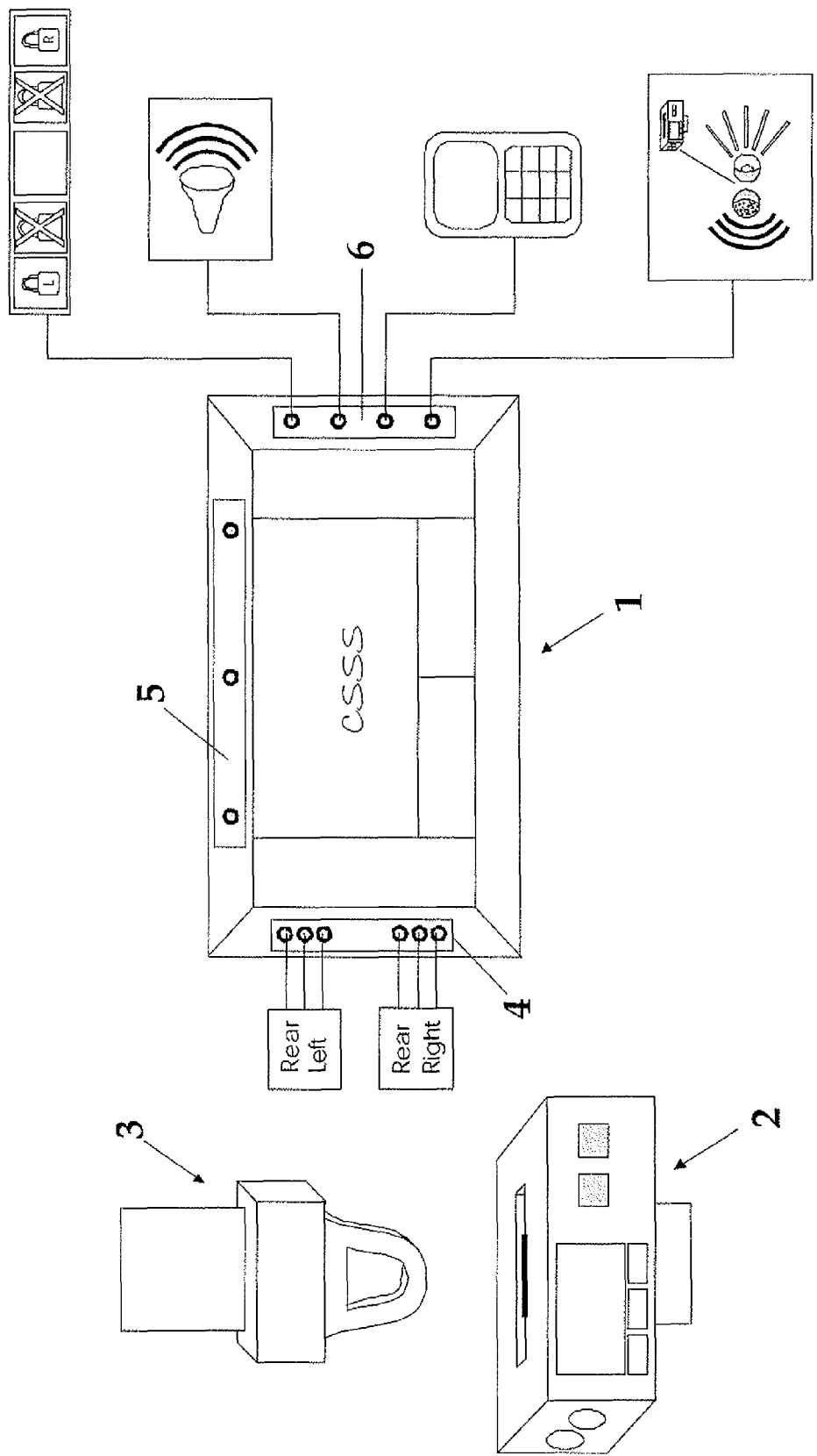
FIG. 1 is a cross-section of the CSSS component parts which are the CSSS Seat Module, the CSSS CPU Module or connection control and monitoring system (center) and alarm indicators via the Communication Outputs (out) to the vehicles dashboard, the child seat, and remote communication devices.

Complimenting the engineering technologies for seat belts, child seats, and LATCH, CSSS assists drivers in a different manner by providing real time monitoring of the occupants status. The CSSS Module (1) would be housed near or around the rear seats of a vehicle. The device is a self contained monitoring and communication system designed to be connected to the vehicles power source via a Power Source Input (8), engine indicators such as an Ignition Sensor (7), safety/accident systems including airbag inflation via a Safety System Input (9), and the physical components for the vehicles Seat Module (2). The CSSS CPU Module CPU System (19) also contains a communication system that is linked to its own warning lights and alarms in the form of Communication Outputs (6) along with the separate connections to the vehicles in-car Dash Board Alarm Output (13), the vehicles horn/alarm system output (14) (horn), and can be configured to communicated with other external communication devices, as programmed. Further explanation of operation through related figures:

FIG. 1 is a cross-section of the three primary CSSS component parts. Specifically, the first component is the CSSS Seat Module (2) which connects to a common vehicles seat belt system for both the left and right rear seats of the vehicle. The Seat Module (2) is attached to the existing child seat harnesses (3). Continuing, the next component is the CSSS Module (1), or connection control and monitoring system. The CSSS Module (1) is built into the framework of the vehicles back seat and would be positioned below the area accommodating child seats. The CSSS Module (1) processes the continuous data streaming from the CSSS Seat Module (2) through the Seat Belt Inputs (4), and various information streams from the Vehicle Inputs (5). In processing such, the CSSS Module (1) will assess such information against user programming to determine whether an alarm signal should generated and sent to specific Communication Outputs (6). These Communication Outputs (6) are components that are integrated into the either the vehicles dashboard or; as part of the CSSS Seat Module (2); or connected to the vehicles horn/alarm system; or lastly can be linked to other common communication devices such as PC's or cell phones.

Figure 2:
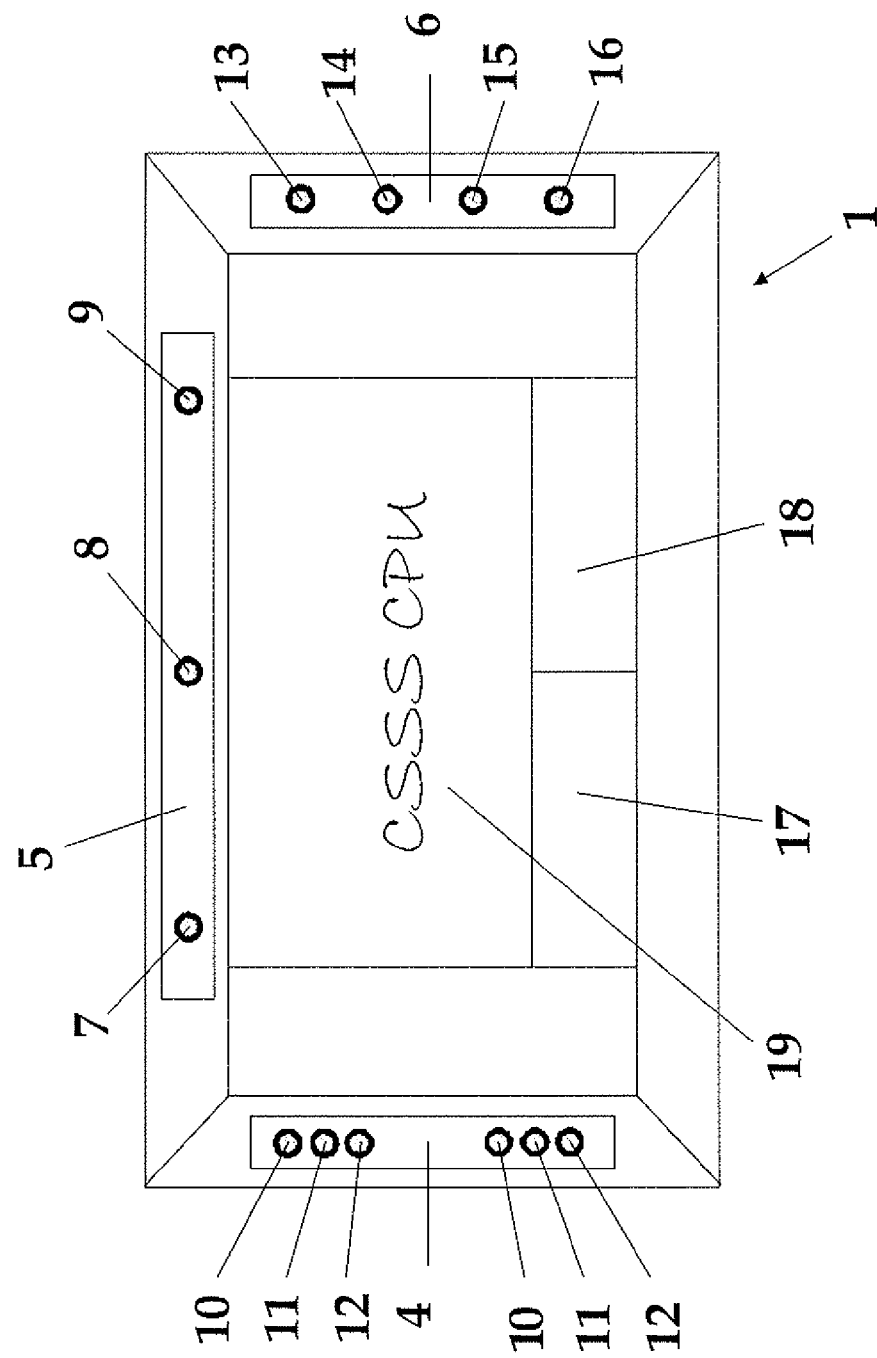
FIG. 2 is a frontal view of the CSSS CPU Module and details the various inputs received from the vehicle monitoring devices, power sources and feedback from the CSSS Seat Module. Furthermore, it details the areas controlling the local and remote alarm systems.

FIG. 2 is a frontal view of the CSSS Module (1). This view details first on the left side the inputs received from both the left and right rear (if two CSSS's systems are used) CSSS Seat Modules (2). Specifically, the Seat Belt Inputs (4) include the devices Seat Module Temperature Input (10) that provides real time temperature readings for the area the Seat Module is located in, the Seat Module Connectivity Input (11) which provides ongoing signals detailing whether the seat belt for the Seat Module (2) is engaged, and the Seat Module Set-up Input (12) which provides the specific user parameters set up by the vehicle driver.

The top portion of the CSSS Module (1) details the Vehicle Inputs (5) which include the Ignition Sensor Input (7) a ongoing connection from the vehicles ignition monitoring system (car on/off) to understand the vehicles operational status, the Power Source Input (8) a connection from the vehicles battery for general power use, and a Safety Sensor Input (9) connecting to the vehicles safety systems (airbag/accident notification) which would communicate any emergency situation.

The indicators located below the CSSS Module (1) detail some the internal components with the module. Specifically, the CSSS Module CPU System (19) is the electrical component that receives all the inputs indicated and processes the information to determine, based on users settings, which alarm communications should be made, if any. Two other components that have housing doors are the Battery Housing (18) for running the CSSS system when the vehicles hard coded power supply fails and also the Timer Component (17) which feeds common time clock and time counts to the CSSS Module CPU (19).

Lastly, on the right side of the CSSS Module (1) the Communication Outputs (6) area includes four specific output leads designated for the CSSS Module CPU (19) communication systems. Specifically, the leads relate to the signal outputs for the vehicles Dash Board Alarm Output (13) which provides real time communications to the drivers heads up dash display, the Vehicle Horn Alarm Output (14) which provides signals for the use of the vehicles horn, the PDA Device (and related) Alarm Output which provides signals to an external communication system (cell phone), and Seat Module Alarm Output which sends signals through a hard line back to the CSSS Seat Module (2) alarm features.

Figure 3:
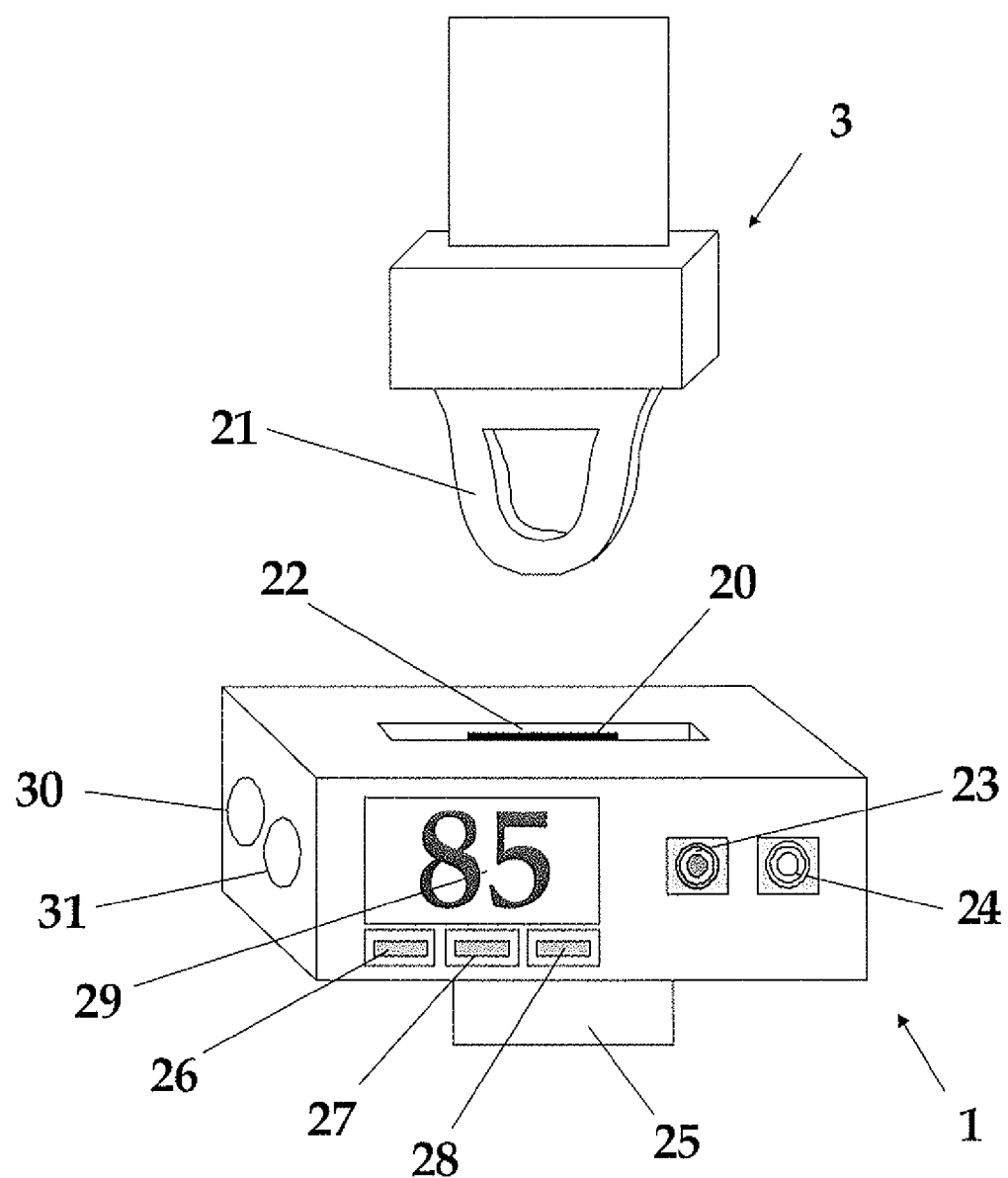
FIG. 3 is a frontal view of the CSSS Seat Module. This figure demonstrates how an existing child seat harness would be inserted into the vehicle equipped component harness clip. This figure further depicts some of the Seat Belt Module monitoring and alarm components.

FIG. 3 is a frontal view of the CSSS Seat Module (2) component. This figure demonstrates how an existing child seat belt (3) with a common Seat Belt Clamp (20) would be inserted into the CSSS Seat Module (2) equipped with a Connection Clip (21). To ensure the safety of an occupant the first assurance of such is the continued use of vehicles safety belts while within the vehicle. CSSS monitors the connectivity of such via a Connection Sensor (22) located within the CSSS Seat Module (2) and notifies the driver immediately when the safety belt is disengaged for any purpose. Notification is immediately made at the CSSS Seat Module (2) via a Seat Module Visual Alarm Component (31) and Seat Module Sound Alarm Component (30) and the connection status changes from "system OK" to "alarm" which also sends a single to the CSSS Module CPU System for further alarm considerations. Separately, a child's safety can be impacted with extreme shifts in vehicle temperature. The CSSS Seat Module (2) provides the driver with a real time monitoring for the temperature at the seat location via Seat Module Temperature Screen (29). The driver can use the program keys, detailed as Seat Module Set-up (27), Increase (26), and Decrease (28) buttons, respectively, to set the desired temperature ranges that are acceptable, or select from pre-set and approved industry/geographical standards. A common LCD readout of such selections will display on the Seat Module Temperature Screen (29). The operational status of the CSSS Seat Module (2) is detailed via the Power On/Off Indicator (23) and the CSSS System Error Indicator Light (24).

Figure 4:
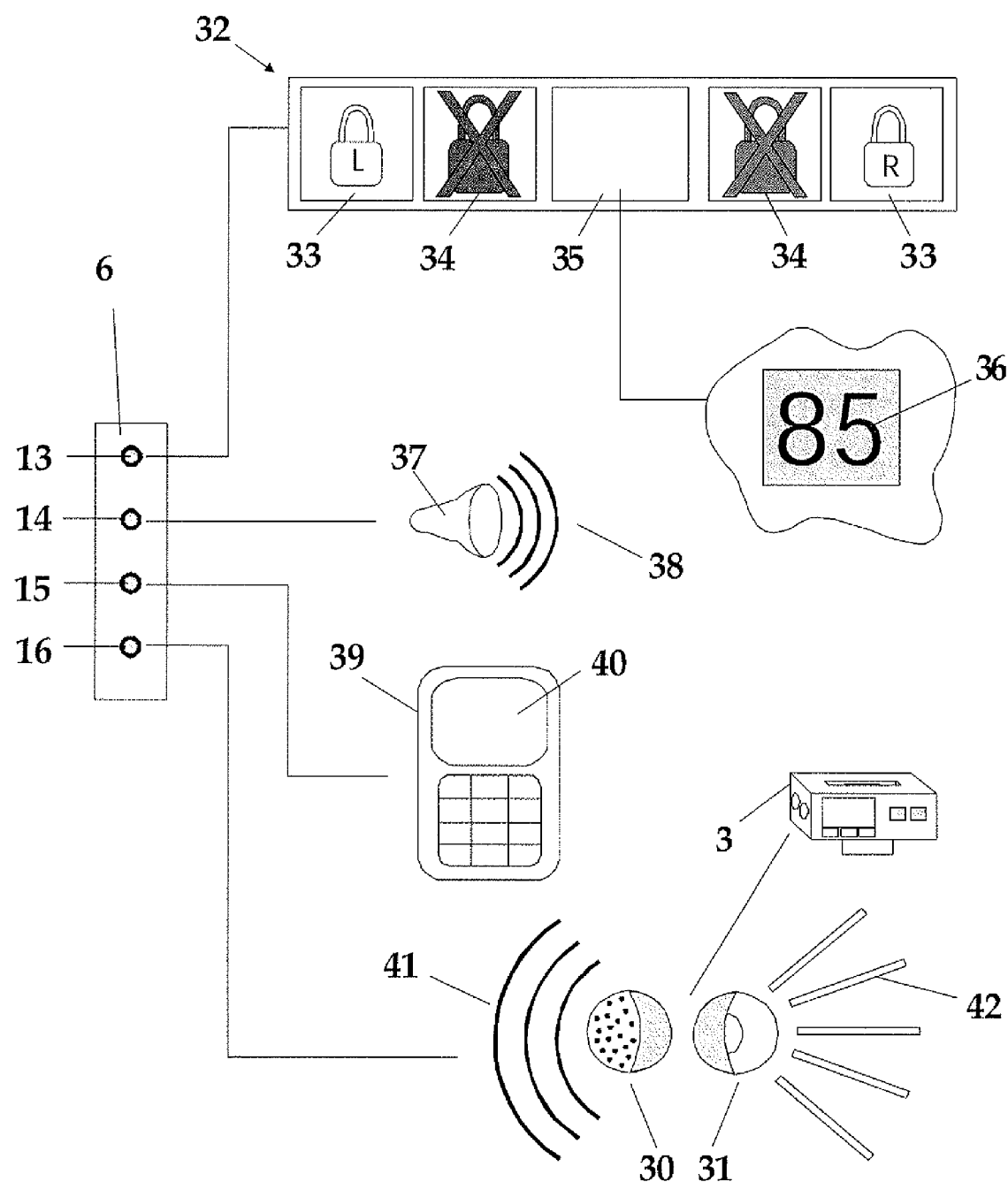
FIG. 4 depicts the methods of CSSS Output Alarms. CSSS CPU Module System programming coordinates the notification of certain alarms to the vehicles monitoring systems and external alarms along with the CSSS Seat Module.

FIG. 4 depicts the methods of communicating CSSS alarms. The CSSS Module CPU programming coordinates the notification of certain alarms by initiating signals through the modules Communication Outputs (6). When certain parameters are met, the following alarm outputs would be initialed: Dash Board Alarm Output (13), Vehicle Horn Alarm Output (14), PDA Device Alarm Output (15), and the Seat Module Alarm Output (16). The following types of driver/bystander communications are available:

Communicating (Alarm) for seat temperature outside of programmed parameters during vehicle operation (motor on and moving). The vehicles owner will program the CSSS Module CPU to acceptable levels of the interior temperature surrounding the respective child seat via the CSSS Seat Module controls as indicated in FIG. 3. When the temperature of the interior either exceeds or falls below such parameters the alarm sequence is initiated, as follows:

1. The primary indication of such will be through the Dash Monitoring Panel (32) in which the indicator lights for the Seat Module Temperature (OK) Indicator Light (35) along with the Seat Module Temperature (NOT OK) Indicator Light (36) would indicate through illumination the seat temperature on an on-going basis.
2. In addition, notification is also made at the CSSS Seat Module (2) Alarm Components (30,31) in the form of flashing lights or a Seat Module Visual Alarm (42) and through sound via the Seat Module Sound Alarm (41) in which the temperature alarm would be indicated.

Communicating (Alarm) for disengaged seat belts during vehicle operation (motor on and moving). An alarm at the seat notifies the vehicles occupants that the seat belt system has been disengaged. This assists the drivers monitoring of the occupant but also trains other occupants and the child seat occupant the importance of the continued connectivity via visual and oral alarms. The associated alarm sequence is as follows:

1. The primary indication of such will be through the Dash Monitoring Panel (32) in which the indicator lights for the Seat Module Secure Indicator Light (33), indicated for both left and right seats, respectively, along with the Seat Module Not Secure Indicator Light (34) would indicate through illumination the connection status on an on-going basis.
2. In addition, notification is also made at the CSSS Seat Module (2) Alarm Components (30, 31) in the form of flashing lights or a Seat Module Visual Alarm (42) and through sound via the Seat Module Sound Alarm (41).

Communicating (Alarm) for unattended occupants to surrounding area of car and to specific driver device(s) when vehicle is not in operation (off) or in operation (on but idle for a certain period of time). CSSS monitors when the vehicle has either stayed idle for a specific period of time or has been turn-off for a specific period of time and the SCCC Seat Module remains engaged. When a set time standard has been passed, CSSS will trigger an alarm sequence, as follows:

1. Initially, CSSS will use the Vehicle Horn (37) to initiate the Vehicle Sound Alarm (38) so that either the driver or other third parties that the Child Seat has an occupant.
2. Initial notification is also made at the CSSS Seat Module (2) Alarm Components (30, 31) in the form of flashing lights or a Seat Module Visual Alarm (42) and through sound via the Seat Module Sound Alarm (41).
3. Secondarily, CSSS, after a specific initial alarm period will sends text, email and calls via a PDA Deice Alarm (40) to owner configured third party communication PDA Device (39) to ensure that the of occupant is removed from the vehicle as soon as possible. Such mobile device notification could also be configured to include a 911 call.

Communicating (Alarm) to direct the attention of emergency personnel or other third parties that an unattended occupant is in the car. If the vehicle is party to an accident and the driver and/or other occupants and incapacitated or can not assist in the removal of a child seats occupants, the following alarm sequence will be triggered to assist emergency personnel in identifying that such an occupant exits upon arrival to the accident location:

1. Initial notification is made at the CSSS Seat Module (2) Alarm Components (30, 31) in the form of flashing lights or a Seat Module Visual Alarm (42) and through sound via the Seat Module Sound Alarm (41).
2. Secondarily, CSSS, after a specific initial alarm period will sends text, email and calls via a PDA Deice Alarm (40) to owner configured third party communication PDA Device (39) to ensure that the of occupant is removed from the vehicle as soon as possible. Such mobile device notification could also be configured to include a 911 call.

Thus is can be seen, how the aforementioned claims address the need for CSSS Module System by improving the safety of child seats. As described, CSSS will provide for the real time monitoring of the children within vehicle child seats in both the capacities of the attached status of seat belts and the within the correct temperature controlled environment. The key is the independent monitoring allows a second layer to the primary defenses each parent should provide to their respective children. The automated function and notification allow for both internal and external alarm communication not currently realized by any existing products. This communication also has the ability to bridge vehicle safety features to the information age via cell phones and PDA's. The final advancement is the use of such automated communication during the case when the driver is either not available or incapacitated which provides a new opportunity for securing a child in emergency situations. Accordingly, we believe CSSS will be the next LATCH mechanism for the auto industry which will continue the social advancement of enhanced safety of travel through innovation. We will be applying to local and NHTSA administrations and US Department of Transportation for product assessment to acquire certification of such organizations.

What I am claiming my invention is:

1. A system for providing monitoring of a child safety seat, the child safety seat being associated with a seat restraint system, the system being coupled to an indicator system of a vehicle and interfacing with mobile devices, comprising:
   a seat module having a connection sensor and a temperature sensor, the connection sensor being coupled to the seat restraint system and configured to provide a seat restraint status signal indicative of the status of the seat restraint system, the temperature sensor being configured to provide real time temperature readings near the child safety seat and responsively provide a temperature signal in response thereto; and,
   a control module coupled to the seat module and configured to receive the seat restraint signal and the temperature signal, the control module being configured to allow a user to establish acceptable interior temperature levels, the control module being further configured (a) to compare the seat restraint signal with a set of predetermined restraint parameters and to provide on-going monitoring and a first alarm signal using the indicator system if the seat restraint signal is outside of the predetermined restraint parameters and (b) to compare the temperature signal to the acceptable interior temperature levels and to provide a second alarm signal using the indicator system if the temperature signal is outside of the acceptable interior temperature levels.

2. The system according to claim 1, the seat module and the control module being power through a vehicle power source, the indicator system including at least one of engine indicators, safety/accident systems, car horn or alarm system.

3. The system according to claim 2, further including a battery backup module for powering the seat module and the control module and being configured to be re-charged by common method via attachment to a battery of the vehicle.

4. The system according to claim 1, the seat module being linked through encased wiring to the control module.

5. The system according to claim 1, the control module being configured to process, sensor and input information and to trigger pre-programmed and/or user directed alarm sequences.

6. The system according to claim 1, the control module being linked to the vehicle's in-dash and horn/alarm systems to be able to communicate an alarm situation.

7. The system according to claim 1, further comprising an LCD display which details a system status at the seat or control modules in real time basis.

8. The system according to claim 1, the control module being programmable by the user to specify ranges of operations including engine idle time, acceptable temperature range, user media and communication channels, and emergency system or user contact information.

9. The system according to claim 1, further comprising a communication system which provides real time feedback to occupants and automatically initiates/communicates alarms.

10. The system according to claim 1, the seat module including independent warning lights and alarms.

11. The system according to claim 1, the control module including connections to communicate alarms via an in-dash indicator panel or a horn or alarm system.

12. The system according to claim 11, the control module being configured to allow for third party communication of on-going system status, or alarms via electronic media or voice message.

13. The system according to claim 12, the control module being configured to determine when driving, to notify a driver when an occupied seat restraint is disengaged.

14. The system according to claim 12, the control module being configured to determine when driving, to notify the driver when an occupied seat is experiencing excessive temperatures.

15. The system according to claim 1, the control module being configured to initiate accident protocols for light and sound signals, and external alarms, user media and third party communications, to alert emergency personnel in the case when the driver is not available or is incapacitated from an accident.

16. The system according to claim 1, the control module including an ignition sensor input coupled to a programmable vehicle ignition monitoring system and a safety sensor input coupled to a vehicle safety system, the ignition sensor being configured to receive a vehicle status signal from the vehicle ignition monitoring system indicative of an on/off status of the vehicle, the safety sensor input being configured to receive an emergency status signal from the vehicle safety system indicative of an emergency situation.

17. The system according to claim 1, wherein the restraint parameters includes an on state of the vehicle and the control module being configured to provide an indication using the indicator system of the seat restraint system being disconnected as a function of the seat restraint status signal.

18. The system according to claim 1, the indicator system in including in-dash indicators and seat indicators on the seat module, the control module being configured to provide visual indication of the temperature as a function of the temperature signal using the in-dash indicators, user media, and the seat indicators.

19. The system according to claim 1, the indicator system in including in-dash indicators, and horn/alarms systems and seat indicators on the seat module, the control module being configured to provide audio and/or visual indication of the status of the seat restraint system as a function of the seat restraint status signal using the in-dash indicators, user media, and the seat indicators.

20. The system according to claim 19, the control system providing an alarm using the in-dash indicators, user media, and horn/alarms systems and seat indicators if the vehicle has been turned off or is idle for a predetermined period of time and the seat restraint system remains connected.

* * * * *